(12) United States Patent
Sasaki

(10) Patent No.: US 9,297,701 B2
(45) Date of Patent: Mar. 29, 2016

(54) ELECTROMAGNETIC WAVE DETECTOR WITH IMPROVED WAVELENGTH SELECTION PROPERTY

(71) Applicant: NEC Corporation, Tokyo (JP)

(72) Inventor: Tokuhito Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/224,896

(22) Filed: Mar. 25, 2014

(65) Prior Publication Data

US 2014/0319359 A1    Oct. 30, 2014

(30) Foreign Application Priority Data

Mar. 27, 2013  (JP) ................................. 2013-065518

(51) Int. Cl.
*G01J 5/20* (2006.01)
*G01J 5/02* (2006.01)
*G01J 5/08* (2006.01)
*G01J 5/22* (2006.01)

(52) U.S. Cl.
CPC ............... *G01J 5/20* (2013.01); *G01J 5/0225* (2013.01); *G01J 5/0837* (2013.01); *G01J 5/22* (2013.01)

(58) Field of Classification Search
CPC .......................................................... G01J 5/20
USPC ............................................. 250/353, 338.1
See application file for complete search history.

(56) References Cited

U.S. PATENT DOCUMENTS

| | | | |
|---|---|---|---|
| 6,329,655 B1 * | 12/2001 | Jack et al. | 250/338.1 |
| 6,495,829 B1 | 12/2002 | Oda | |
| 7,557,349 B2 | 7/2009 | Oda et al. | |
| 8,957,379 B2 * | 2/2015 | Corcos et al. | 250/341.1 |
| 2008/0237467 A1 * | 10/2008 | Oda et al. | 250/338.3 |

FOREIGN PATENT DOCUMENTS

| | | |
|---|---|---|
| JP | 3597069 | 12/2004 |
| JP | 3821040 | 9/2006 |
| JP | 5109169 | 12/2012 |

OTHER PUBLICATIONS

R. A. Wood, "Uncooled Infrared Imaging Arrays and Systems", Semiconductors and Semimetals, vol. 47, volume editors P. W. Kruse & D. D. Skartrud, Academic Press, p. 103, 1997.

\* cited by examiner

*Primary Examiner* — David Porta
*Assistant Examiner* — Faye Boosalis
(74) *Attorney, Agent, or Firm* — Finnegan, Henderson, Farabow, Garrett & Dunner LLP

(57) ABSTRACT

In order to improve efficiency for converting electromagnetic energy into heat energy, an electromagnetic wave detector detecting an electromagnetic wave having a specific wavelength includes a substrate in which a read-out circuit is formed; a temperature detecting portion with a space from the substrate and which includes a bolometer thin film and a first antenna wire; a supporting portion which supports the temperature detecting portion with a space from the substrate and which includes electrode wires connected to the read-out circuit and to the bolometer thin film; and a reflecting portion which is provided to the substrate and which reflects the electromagnetic wave penetrating the temperature detecting portion toward the temperature detecting portion.

20 Claims, 9 Drawing Sheets

ELECTROMAGNETIC WAVE DETECTOR WITH IMPROVED WAVELENGTH SELECTION PROPERTY

This application is based upon and claims the benefit of priority from Japanese patent application No. 2013-065518, filed on Mar. 27, 2013, the disclosure of which is incorporated herein in its entirety by reference.

BACKGROUND OF THE INVENTION

1. Field of the Invention

This invention relates to an electromagnetic wave detector detecting an electromagnetic wave having a predetermined frequency band (infrared rays or an electromagnetic wave (a THz wave) having a THz frequency band) and, more particularly, to a bolometer-type light detector and an image pickup device providing therewith.

2. Description of Related Art

As one example of image pickup devices for picking up an infrared ray, a bolometer-type infrared image pickup device comprising one-dimensional or two-dimensional sensor array and a read-out circuit is known (see, Japanese Patent No. 3821040 (which will later be called Patent Literature 1)). The bolometer-type infrared image pickup device disclosed in Patent Literature 1 is configured to arrange a plurality of thermoelectric conversion elements in a two-dimensional matrix fashion and to detect and produce a received infrared ray signal every thermoelectric conversion element.

In addition, generally, a bolometer-type thermal infrared array sensor of the type described comprises a thermal separation structure composed of a diaphragm and beams (see, R. A. Wood, "Uncooled Infrared Image Arrays and Systems", Semiconductors and Semimetals, Vol. 47, volume editors P. W. Kruse & D. D. Skartrud, Academic Press, 1997, p. 103 (which will later be called Non Patent Literature 1) and Japanese Patent No. 3597069 (which will later be called Patent Literature 2 and which corresponds to U.S. Pat. No. 6,495,829 B1)).

Patent Literature 2 discloses the thermal infrared array sensor in which an infrared full reflective film is formed on a substrate immediately below the diaphragm, a protection film of the diaphragm is made of a material which is transparent to the infrared ray, and an infrared absorption thin film with a vacuum impedance matching is formed on an upper surface of the diaphragm. A distance between the infrared absorption film and the infrared full reflective film is set to be a distance so as to absorb the infrared ray other than a predetermined wavelength band due to an interference to cancel to each other between the infrared absorption film and the infrared full reflective film.

Japanese Patent No. 5109169 (which will later be called Patent Literature 3 and which corresponds to U.S. Pat. No. 7,557,349 B2) discloses a bolometer-type THz-wave detector which has high performance and can be manufactured with high yield. The bolometer-type THz-wave detector disclosed in Patent Literature 3 detects a THz wave using an optical resonance structure used in of a bolometer-type infrared detector. Patent Literature 3 discloses, as a second embodiment, the bolometer-type THz-wave detector having structure where an absorbing film for absorbing the THz wave is added to a temperature detecting portion in order to efficiently absorb the THz wave having transmitted the temperature detecting portion. In addition, Patent Literature 3 also discloses, as a third embodiment, the bolometer-type THz-wave detector having structure where a canopy extending outward from the peripheral portion of the temperature detecting portion is formed on the temperature detecting portion.

Each of the thermistor bolometer thermal infrared array sensor disclosed in Patent Literature 2 and the bolometer-type THz-wave detector disclosed in Patent Literature 3 is provided with the optical resonance structure (an optical resonator) which causes the incident infrared ray or the THx wave to resonate in a traveling direction thereof. More specifically, a conventional optical resonance structure (a conventional optical resonator) uses an inter-gap resonance between the reflective film and the diaphragm (the temperature detecting portion). In the thermistor bolometer thermal infrared array sensor and the bolometer-type THz-wave detector each of which is provided with the conventional optical resonance structure (the conventional optical resonator) of such a structure, there is a limitation in performance of heat exchange. In other words, it is impossible to improve efficiency for converting electromagnetic energy into heat energy.

SUMMARY

It is an object of the present invention to provide an electromagnetic wave detector which is capable of improving efficiency for converting electromagnetic energy into heat energy and to an image pickup device provided therewith.

In a first aspect of the present invention, there is provided an electromagnetic wave detector configured to detect an electromagnetic wave having a specific wavelength. The electromagnetic wave detector comprises a substrate in which a read-out circuit is formed, a temperature detecting portion disposed with a space from the substrate and including a bolometer thin film and a first antenna wire, a supporting portion configured to support the temperature detecting portion with a space from the substrate and including electrode wires which are connected to the read-out circuit and to the bolometer thin film, and a reflecting portion provided to the substrate and reflecting the electromagnetic wave penetrating the temperature detecting portion toward the temperature detecting portion.

In a second aspect of the present invention, there is provided an electromagnetic wave detector configured to detect an electromagnetic wave having a specific wavelength. The electromagnetic wave detector comprises a substrate in which a read-out circuit is formed, a temperature detecting portion disposed with a space from the substrate and including a bolometer thin film and a resistor, a supporting portion configured to support the temperature detecting with a space from the substrate and including electrode wires which are connected to the read-out circuit and to the bolometer thin film, and a first antenna wire electrically connected to the resistor. The first antenna wire is disposed so that the electromagnetic wave entering to the temperature detecting portion vertically passes through a surface enclosed with the first antenna wire.

In a third aspect of the present invention, there is provided an electromagnetic wave detector configured to detect an electromagnetic wave having a specific wavelength. The electromagnetic wave detector comprises a substrate in which a read-out circuit is formed, a temperature detecting portion disposed with a space from the substrate and including a bolometer thin film, a supporting portion configured to support the temperature detecting portion with a space from the substrate and including electrode wires which are connected to the read-out circuit and to the bolometer thin film, and a canopy conveying generated heat to the temperature detecting portion and including a first antenna wire. The first antenna wire is disposed so that the electromagnetic wave entering to the temperature detecting portion vertically passes through a surface enclosed with the first antenna wire.

It is possible to improve efficiency for converting electromagnetic energy into heat energy.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF EXEMPLARY EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

[Related Art]

Before describing the present invention, the related art will be explained in detail with reference to figures in order to facilitate the understanding the present invention.

Figure 1:
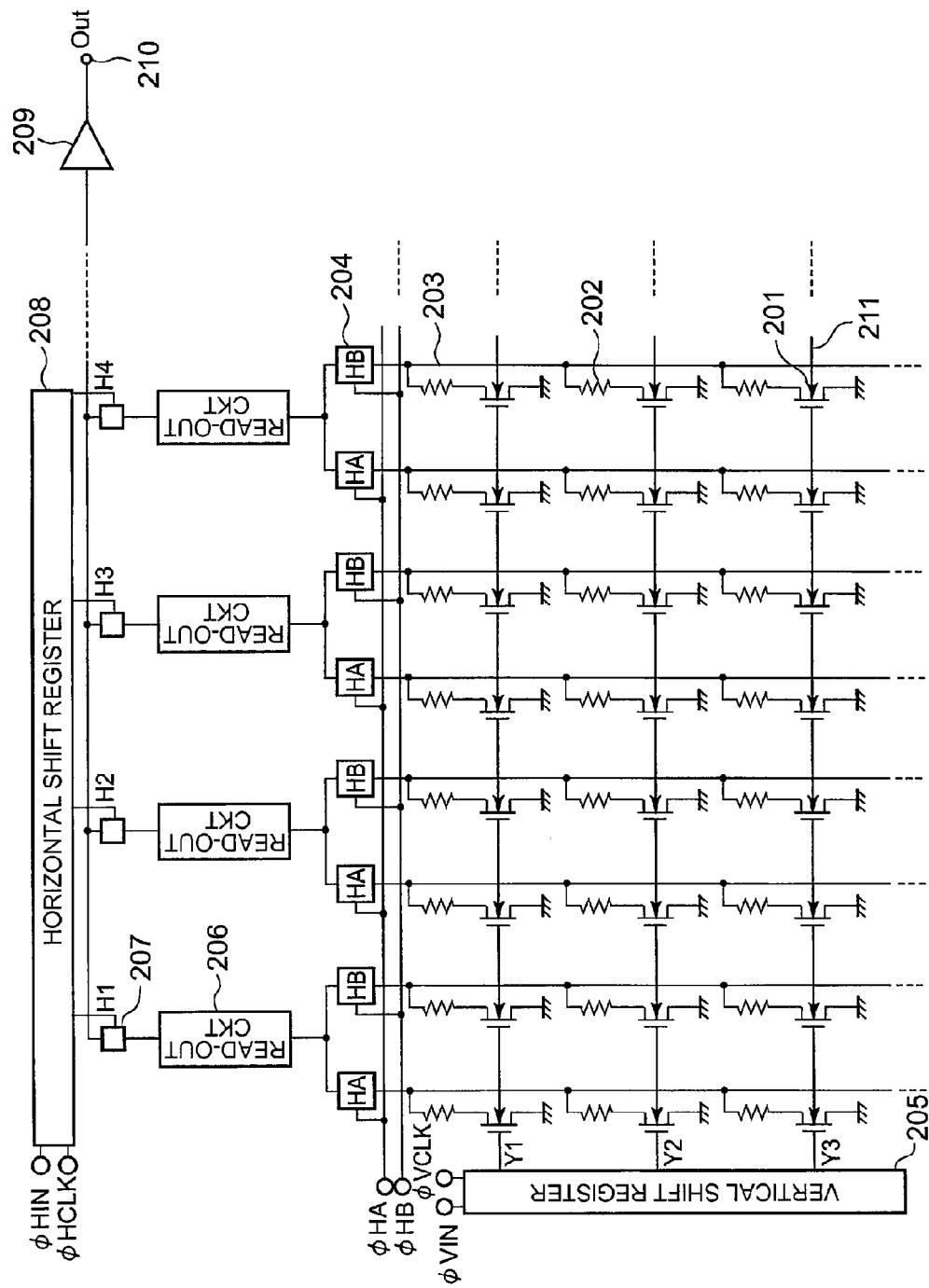
FIG. 1 is a view showing a general structure of a related image pickup device (a related bolometer-type infrared image pickup device)
Figure 2:
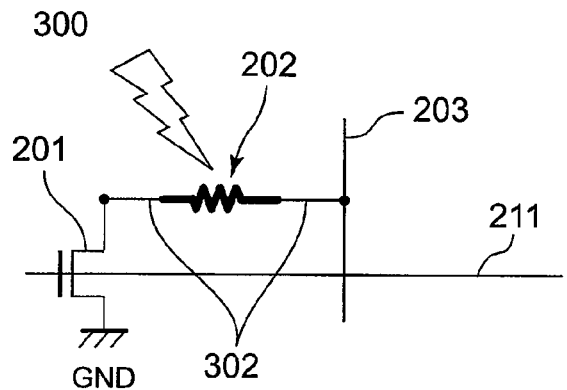
FIG. 2 is a circuit diagram enlargedly showing the vicinity of one thermoelectric conversion element illustrated in FIG. 1.

FIG. 1 is a view showing a general structure of a related image pickup device (a related bolometer-type infrared image pickup device) that is disclosed in FIG. 2 of the above-mentioned Patent Literature 1. FIG. 1 partially illustrates a readout circuit and a two-dimensional sensor array in the related bolometer-type infrared image pickup device.

The image pickup device comprises a device which is configured to arrange a plurality of thermoelectric conversion elements in a two-dimensional matrix fashion and to detect and produce a received infrared ray signal every thermoelectric conversion element.

The image pickup device comprises a plurality of thermoelectric conversion elements 202 disposed in a two-dimensional matrix fashion, a plurality of picture element switches 201 connected to the thermoelectric conversion elements 202, a plurality of signal lines 203 extending in a vertical direction and connected to the thermoelectric conversion elements 202, a plurality of horizontal switches 204 connected to the respective signal lines 203, a plurality of scanning lines 211 extending in a horizontal direction so as to penetrate the picture element switches 201, a vertical shift register 205 connected to the scanning lines 211, a plurality of read-out circuits 206 connected to the horizontal switches 204 in pairs, a plurality of multiplexer switches 207 connected to the respective read-out circuits 206, a horizontal shift register 208 connected to the multiplexer switches 207, an output buffer 209 connected to the multiplexer switches 207, and an output terminal 210 connected to the output buffer 209.

The image pickup device can carry out parallel processing on detected signals by using the picture element switches 201 selected by the vertical shift register 205 via the scanning lines 211 and by using the read-out circuits 206 connected to the thermoelectric conversion elements 202 via the signal lines 203. Output signals of the plurality of read-out circuits 206 are successively output by the horizontal shift register 208 to the external from the output terminal 210 via the multiplexer switches 207 and the output buffer 209.

In the example being illustrated, the thermoelectric conversion elements 202 are arranged in a two-dimensional matrix fashion on a substrate (not shown) and are sequentially selected by switching them by the picture element switches 201 and the horizontal switches 204. The picture element switches 202 are provided at positions of intersection of the signal lines 203 and the scanning lines 211. Each picture element switch 201 comprises an N-channel MOSFET (metal oxide semiconductor field effect transistor) which has a source grounded, a drain connected to the signal line 203 via the thermoelectric conversion element 202, and a gate connected to the scanning line 211.

The signal lines 203 are connected to the read-out circuits 206 via the horizontal switches 204. Output terminals of the read-out circuits 206 are connected to the output buffer 209 via the multiplexer switches 207. On-off control of the multiplexer switches 207 is carried out by the horizontal shift register 208.

The read-out circuits 206 are provides every two columns of the matrix in order to read signals of the respective thermoelectric conversion elements 202. The vertical shift register 205 sequentially selects respective rows of the matrix. The horizontal shift register 208 sequentially selects the multiplexer switches 207 to deliver output signals of the respective read-out circuits 206 to the output buffer 209.

FIG. 2 is a circuit diagram enlargedly showing the vicinity of one thermoelectric conversion element 202 illustrated in FIG. 1. The thermoelectric conversion element 202 is also referred to as a diaphragm or a temperature detecting portion. The signal line 203 is also called a signal wire while the scanning line 211 is also called a gate wire. The thermoelectric conversion element (the diaphragm; the temperature detecting portion) 202 is thermally separated from a silicon substrate 308 (see, FIG. 3B) by means of beams (midair wires) 302 (see, FIG. 3A).

Figure 3A:
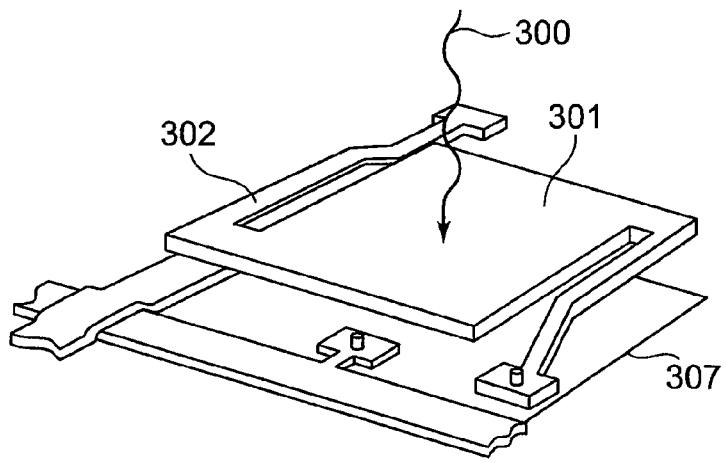
FIG. 3A is a schematic perspective view illustrative of a related thermistor bolometer thermal infrared array sensor.
Figure 3B:
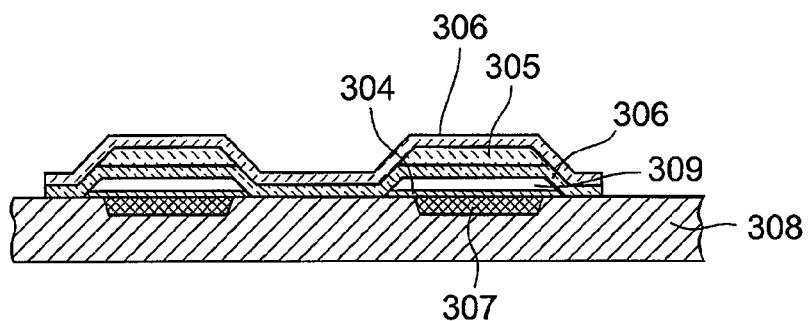
FIG. 3B is a fragmentary cross sectional elevation view illustrative of the related thermistor bolometer thermal infrared array sensor illustrated in FIG. 3A.
Figure 7:
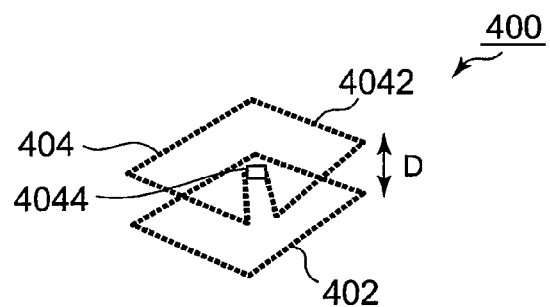
FIG. 7 is a schematic perspective view illustrative of only an electromagnetic wave resonance structure according to a first example of this invention that is used in the electromagnetic wave detector according to the first exemplary embodiment illustrated in FIG. 6.

FIGS. 3A and 3B are a schematic perspective view and a fragmentary cross sectional elevation view illustrative of a related thermistor bolometer thermal infrared array sensor, respectively, that is disclosed in the above-mentioned Non Patent Literature 1 (in FIG. 7 of the above-mentioned Patent Literature 2).

As shown in FIG. 3A, the related thermistor bolometer thermal infrared array sensor comprises a thermal separation structure which is composed of a diaphragm 301 and the beams (the midair wires) 302. In the manner which is described above, the diaphragm 301 corresponds (is equivalent) to the thermoelectric conversion element 202 illustrated in FIG. 1.

As shown in FIG. 3B, the diaphragm 301 comprises a bolometer material thin film 305 having a large temperature coefficient, electrodes (not shown), and protective films 306 which sandwich and surround the bolometer material thin film 305. The beams 302 are provided with electric wirings (not shown) which comprise metal thin films each having a low thermal conductivity. The bolometer metal thin film 305 is made of VOx, the protective film 306 is made of SiN, and the metal thin film is made of NiCr. The diaphragm 301 is connected to the silicon substrate 308 in which a read-out circuit 307 is mounted. A cavity 309 is formed between the diaphragm 301 and a surface of the silicon substrate 308. A full reflective film 304 is provided over the silicon substrate 308 (the read-out circuit 307). The read-out circuit 307 corresponds to the read-out circuit 206 illustrated in FIG. 1.

In the manner which is described above, the diaphragm 301 (the thermoelectric conversion element 202) is supported in a space by means of the beams 302 extending from the silicon substrate 308. The diaphragm 301 (the thermoelectric conversion element 202) is arranged so as to correspond to one picture element.

An infrared ray 300 is incident into the diaphragm 301 and a part of the incident infrared ray 300 is absorbed into the protective films 306 made of SiN whilst a remaining part of the incident infrared ray 300 is transmitted through the diaphragm 301 and the cavity 309 to the full reflective film 304, whereby the remaining part of the incident infrared ray 300 is fully reflected by the full reflective film 304 and then absorbed into the protective films 306 made of SiN. The absorption of the infrared ray 300 causes a temperature rising of the diaphragm 301. The temperature rising of the diaphragm 301 causes variation in a resistance of the bolometer whereby variation in voltage can be detected. If a temperature of a subject is lower than the original temperature of the diaphragm 301, then diaphragm 301 shows a heat radiation to cause a temperature drop of the diaphragm 301, whereby the resistance of the bolometer is varied. The infrared ray absorption band of the protective films 306 made of SiN is 10 micrometers wavelength band, for which reason the above thermal infrared sensor is operable in this wavelength band.

In the manner which is described above, although FIGS. 3A and 3B do not illustrate, the above-mentioned Patent Literature 2 discloses the thermal infrared array sensor in which an infrared full reflective film is formed on the substrate 308 immediately below the diaphragm 301, the protection films 306 of the diaphragm 301 are made of a material which is transparent to the infrared ray 300, and an infrared absorption thin film with a vacuum impedance matching is formed on an upper surface of the diaphragm 301. A distance between the infrared absorption film and the infrared full reflective film is set to be a distance so as to absorb the infrared ray other than a predetermined wavelength band due to an interference to cancel to each other between the infrared absorption film and the infrared full reflective film.

In the manner described above, in the related thermistor bolometer thermal infrared array sensor, an optical resonance structure (a so-called optical resonator) causing the incident infrared ray 300 to resonate in a traveling direction thereof comprises the full reflective film 304 and the diaphragm 301 by forming the full reflective film 304 on the substrate 308 and by forming the infrared absorption film on the diaphragm 301.

Figure 4:
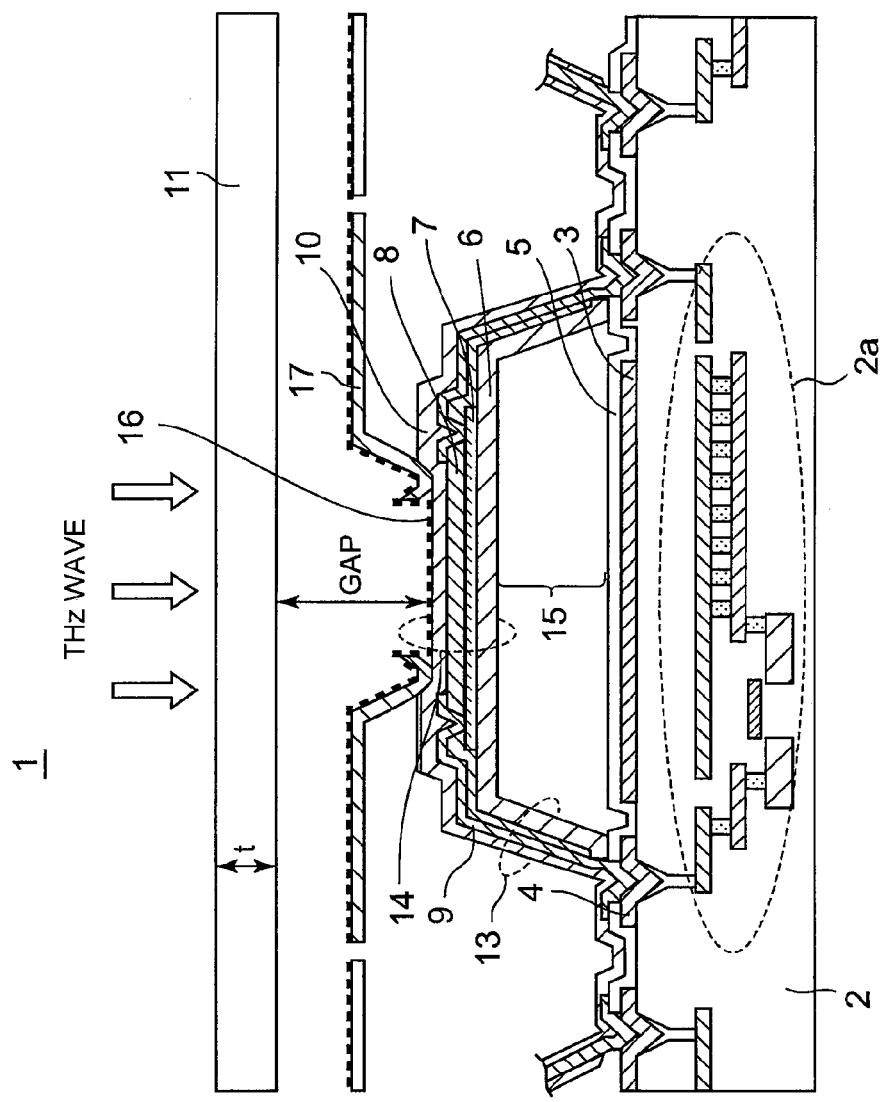
FIG. 4 is a sectional view schematically illustrating a structure of a related bolometer-type THz-wave detector.
Figure 14:
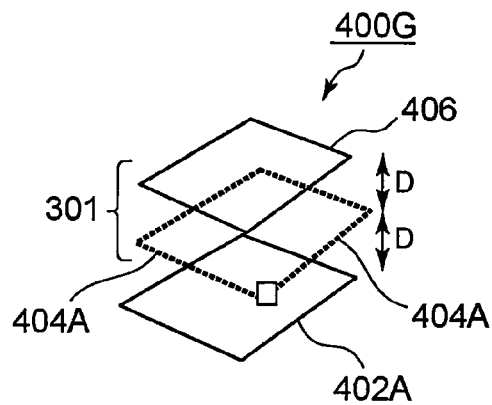
FIG. 14 is a schematic perspective view illustrative of only an electromagnetic wave resonance structure according to an eighth example of this invention that is used in the electromagnetic wave detector according to the first exemplary embodiment illustrated in FIG. 6.

FIG. 4 is a sectional view schematically illustrating structure of one pixel of a related bolometer-type THz-wave detector 1, which is disclosed in FIG. 14 of the above-mentioned Patent Literature 3.

The related bolometer-type THz-wave detector 1 comprises, on a circuit substrate 2 on which a read-out circuit 2a and the like are formed, a reflective film 3 reflecting an incident THz wave and a contact 4 connected to the read-out circuit 2a. A first protective film 5 is formed on top of the contact 4. On the contact 4, a supporting portion 13 comprising a second protective film 6, a third protective film 8, an electrode wiring 9, and a fourth protective film 10 is formed. The electrode wiring 9 is connected to the read-out circuit 2a through the contact 4. By the supporting portion 13, a temperature detecting portion 14 (diaphragm) comprising the second protective film 6, a bolometer thin film 7, the third protective film 8, and the fourth protective film 10 is held in the air. The both ends of the bolometer thin film 7 are connected to the electrode wiring 9.

Inasmuch as the temperature detecting portion 14 easily transmits the THz wave, a dielectric material (hereinafter referred to as a dielectric cover 11) is arranged at an upper part of the temperature detecting portion 14. The dielectric cover 11 has a product of a reflective index n and a thickness (that is, an optical path length) larger than the wavelength of THz wave. The dielectric cover 11 is constructed by a silica glass, HRFZ (High Resistivity Float Zone) silicon, sapphire, artificial diamond and the like.

By arranging the dielectric cover 11 as above, on a back side (outgoing face of the THz wave) of the dielectric cover 11, an electric field of the incident wave propagated through the dielectric cover 11 and an electric field of a reflective wave reflected on the back side reinforce each other in the same sign, and the THz wave can be efficiently collected on the back side ($n^3$ times).

Also, by setting a gap between the dielectric cover 11 and the temperature detecting portion 14 (GAP in FIG. 4, in more detail, a gap between the back side of the dielectric cover 11 and the center in the thickness direction of the temperature detecting portion 14) at integral multiples of the half wavelength of the THz wave, the THz wave present in a space held between the back side of the dielectric cover 11 and the reflective film 3 can be reinforced by the optical resonance. As a result, the THz wave can be efficiently absorbed by the temperature detecting portion 14.

A canopy 17 extending outward from the peripheral portion on the temperature detecting portion 14 is formed on the temperature detecting portion 14. By this arrangement, the THz wave incident to the supporting portion 13 and the region between pixels can be made available so that the THz wave can be absorbed more efficiently.

A film of metal such as Al, Ti is formed by the sputtering method and then, a pattern is formed with resist as a mask so that an absorbing film 16 is formed on the temperature detecting portion 14 and the canopy 17.

As mentioned above, by forming the canopy 17 extending outward from the peripheral portion of the temperature detecting portion 14 on the temperature detecting portion 14, the THz wave incident to the supporting portion 13 and the region between the pixels can be also effectively utilized. Thus, the absorptance of the THz wave can be improved, and a high-performance bolometer-type THz-wave detector 1 can be manufactured with a good yield. Also, inasmuch as this bolometer-type THz-wave detector 1 can also absorb the infrared ray with a considerably high absorptance, it can be also used as the bolometer-type infrared detector as it is.

In the manner which is described above, in the related bolometer-type THz-wave detector 1, the optical resonance structure (the so-called optical resonator) causing the incident THz wave to resonate in the traveling direction thereof comprises the reflective film 3 and the temperature detecting portion 13, by forming the reflective film 3 for reflecting the THz wave on the circuit substrate 2 at the position opposite to the temperature detecting portion 13 and by forming the absorbing film 16 for absorbing the THz wave on the temperature detecting portion 14 and on the canopy 17.

In the manner which is described above, the related thermistor bolometer thermal infrared array sensor illustrated in FIGS. 3A and 3B and the related bolometer-type THz-wave detector 1 illustrated in FIG. 4 comprise the optical resonance structure (the optical resonator) causing the incident infrared ray or the incident THz wave to resonate in the traveling direction thereof alone. That is, the optical resonance structure (the optical resonator) uses an inter-gap resonance between the reflective film and the diaphragm (the temperature detecting portion). The related thermistor bolometer thermal infrared array sensor and the related bolometer-type THz-wave detector 1, each of which comprises such as an optical resonance structure (an optical resonator) of the type described, have the limitations of performance of heat exchange. In other words, it is impossible to improve efficiency for converting electromagnetic energy into heat energy.

[First Exemplary Embodiment]

Referring now to Figures, the description will proceed to a first exemplary embodiment of this invention.

Figure 5:
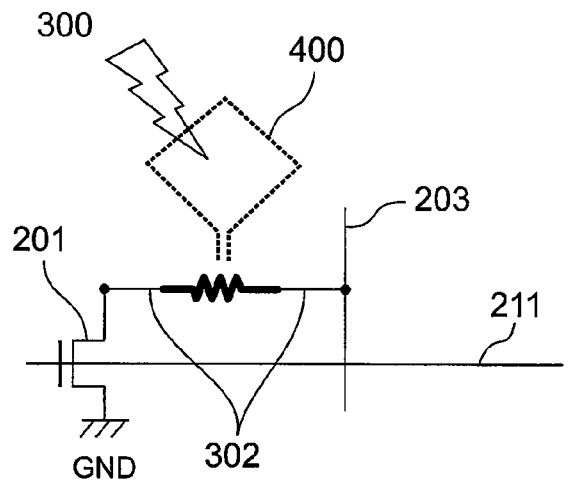
FIG. 5 is a circuit diagram showing an electromagnetic wave detector according to a first exemplary embodiment of this invention (by enlarging the vicinity of one thermoelectric conversion element illustrated in FIG. 1)
Figure 6:
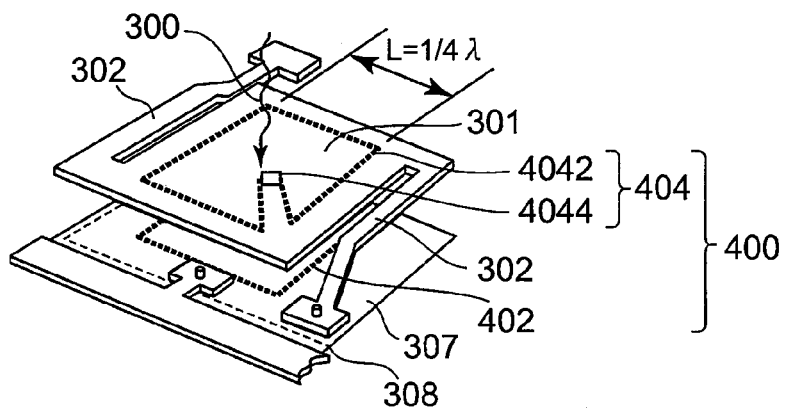
FIG. 6 is a view showing a structure of the electromagnetic wave detector according to the first exemplary embodiment of this invention (a schematic perspective view illustrative of a thermistor bolometer thermal infrared array sensor according to the first exemplary embodiment of this invention)

Referring to FIGS. 5 and 6, the description will proceed to an electromagnetic wave detector according to the first exemplary embodiment of the present invention. FIG. 5 is a circuit diagram showing the electromagnetic wave detector according to the first exemplary embodiment of the present invention. FIG. 5 is the circuit diagram enlargedly showing, as the electromagnetic wave detector, the vicinity of one thermoelectric conversion element 202 illustrated in FIG. 1. FIG. 6 is a configuration view of the electromagnetic wave detector according to the first exemplary embodiment of the present invention. FIG. 6 is a schematic perspective view illustrative of a thermistor bolometer thermal infrared array sensor as the electromagnetic wave detector.

The illustrated electromagnetic wave detector is similar in structure to the related electromagnetic wave detector illustrated in FIGS. 2, 3A, and 3B except that the electromagnetic wave detector further comprises an electromagnetic wave resonance structure 400 which will later be described. Accordingly, the same reference signs are attached to those similar to those illustrated in FIGS. 2, 3A, and 3B. Hereinafter, the description will proceed to only differences in order to simplify the description.

The electromagnetic wave resonance structure 400 is provided to the silicon substrate 308 and the diaphragm (the temperature detecting portion) 301. The electromagnetic wave resonance structure 400 is configured to convert the electromagnetic wave having the specific wavelength λ to heat to deliver the converted heat to the diaphragm (the temperature detecting portion) 301.

In the example being illustrated, the electromagnetic wave comprises an infrared ray having the specific wavelength λ which is laid in a range between 2 micrometer and 20 micrometer, both inclusive.

The electromagnetic wave resonance structure 400 comprises a loop antenna wire which comprises a reflector 402 formed on the silicon substrate 308 and a radiator 404 formed in the diaphragm (the temperature detecting portion) 301. In the example being illustrated, the radiator 404 has a loop length with a length equal to the specific wavelength and includes electromagnetic wave/heat converting means (which will later be described) configured to convert the electromagnetic wave having the specific wavelength λ to the heat.

More specifically, in the example being illustrated, the reflector 402 comprises a square reflector wire having four sides L each of which is set in a quarter of the specific wavelength λ. The radiator 404 comprises a square radiator wire 4042 and a heating resistive element 4044. The square radiator wire 4042 has four sides L each of which is set in a quarter of the specific wavelength λ. The heating resistive element 4044 is connected to radiator wire 4042 and serves as the electromagnetic wave/heat converting means. In the example being illustrated, the heating resistive element 4044 is disposed in a center portion of the radiator wire 4042.

When the electromagnetic wave passes through a plane enclosed with the radiator wire 4042, a magnetic field of an area enclosed with the radiator wire 4042 changes, and therefore a current flows in the radiator wire 4042 by electromagnetic induction. Due to flowing of the current, a current flows in the heating resistive element 4044 connected to the radiator wire 4042, and therefore the heating resistive element 4044 generates heat. The heat generated by the heating resistive element 4044 is conveyed to the diaphragm 301.

In the manner which is described above, the electromagnetic wave detector according to the first exemplary embodiment produces an effect that it is possible to improve the efficiency for converting electromagnetic energy into heat energy because the heat generated by the heating resistive element 4044 is conveyed to the diaphragm 301.

[Second Exemplary Embodiment]

Now, the description will proceed to a second exemplary embodiment of this invention.

Although it is not illustrated, an electromagnetic wave detector according to the second exemplary embodiment of this invention comprises, in the related electromagnetic wave detector illustrated in FIG. 4, an electromagnetic wave resonance structure (not shown) in lieu of the absorbing film 16.

The electromagnetic wave resonance structure is provided to the silicon substrate 2 and the canopy 17. The electromagnetic wave resonance structure is configured to convert the electromagnetic wave having the specific wavelength λ to heat to deliver the converted heat to the temperature detecting portion 14.

In a case of the second exemplary embodiment, the electromagnetic wave comprises a THz wave having the specific wavelength λ which is laid in a range between 3 millimeter and 30 micrometer, both inclusive.

The electromagnetic wave resonance structure comprises a reflector formed on the circuit substrate 2 and a radiator formed on the canopy 17. The radiator has a loop length with a length equal to the specific wavelength λ and includes electromagnetic wave/heat converting means configured to convert the electromagnetic wave having the specific wavelength λ to the heat.

When the electromagnetic wave passes through a plane enclosed with the radiator wire 4042, a magnetic field of an area enclosed with the radiator wire 4042 changes, and therefore a current flows in the radiator wire 4042 by electromagnetic induction. Due to flowing of the current, a current flows in the heating resistive element 4044 connected to the radiator wire 4042, and therefore the heating resistive element 4044 generates heat. The heat generated by the heating resistive element 4044 is conveyed to the diaphragm 301.

In the manner which is described above, the electromagnetic wave detector according to the second exemplary embodiment produces an effect that it is possible to improve the efficiency for converting electromagnetic energy into heat energy because the heat generated by the heating resistive element 4044 is conveyed to the diaphragm 301.

[Third Exemplary Embodiment]

Now, the description will proceed to a third exemplary embodiment of this invention.

An electromagnetic wave detector according to the third exemplary embodiment of this invention comprises an electromagnetic wave resonance structure which is provided to a supporting portion and a temperature detecting portion.

The electromagnetic wave resonance structure is configured to convert the electromagnetic wave having the specific wavelength λ to heat to deliver the converted heat to the temperature detecting portion.

In a case of the third exemplary embodiment, the electromagnetic wave comprises an infrared ray having the specific wavelength λ which is laid in a range between 2 micrometer and 20 micrometer, both inclusive.

The electromagnetic wave resonance structure comprises a reflector formed on the supporting portion and a radiator formed on the temperature detecting portion. The radiator has a loop length with a length equal to the specific wavelength λ and includes electromagnetic wave/heat converting means configured to convert the electromagnetic wave having the specific wavelength λ to the heat.

When the electromagnetic wave passes through a plane enclosed with the radiator wire 4042, a magnetic field of an area enclosed with the radiator wire 4042 changes, and therefore a current flows in the radiator wire 4042 by electromagnetic induction. Due to flowing of the current, a current flows in the heating resistive element 4044 connected to the radiator wire 4042, and therefore the heating resistive element 4044 generates heat. The heat generated by the heating resistive element 4044 is conveyed to the diaphragm 301.

In the manner which is described above, the electromagnetic wave detector according to the third exemplary embodiment produces an effect that it is possible to improve the efficiency for converting electromagnetic energy into heat energy because the heat generated by the heating resistive element 4044 is conveyed to the diaphragm 301.

[Fourth Exemplary Embodiment]

Now, the description will proceed to a fourth exemplary embodiment of this invention.

An image pickup device according to the fourth exemplary embodiment of this invention has a configuration in which a plurality of electromagnetic wave detectors each described in any one of the above-mentioned first through the third exemplary embodiments are arranged in a two-dimensional matrix fashion as the thermoelectric conversion elements 202 as shown in FIG. 1.

According to the image pickup device having such a structure, it produces en effect where it has an excellent sensitivity as a whole because each electromagnetic wave detector has an excellent sensitivity.

EXAMPLE 1

Referring now to FIG. 7, the description will proceed to the electromagnetic wave resonance structure 400 according to a first example of this invention.

FIG. 7 is a schematic perspective view illustrative of only the electromagnetic wave resonance structure 400 used in the electromagnetic wave detector according to the first exemplary embodiment illustrated in FIG. 6.

The electromagnetic wave resonance structure 400 illustrated in FIG. 7 is similar in structure to the electromagnetic wave resonance structure 400 illustrated in FIG. 6. Accordingly, the same reference signs are attached to those similar to those illustrated in FIG. 6 and the description thereof is omitted.

In the illustrated electromagnetic wave resonance structure 400, the specific wavelength λ and a gap D between the reflector 402 and the radiator 404 are satisfied with a following expression:

$$0.1\lambda \leq D \leq 0.25\lambda.$$

Accordingly, the illustrated electromagnetic wave resonance structure 400 comprises a Cubical Quad loop antenna wire including the heating resistive element 4044.

Now, the description will proceed to an effect of the first example of this invention.

The first example has the effect in which it is possible to effectively transfer the converted heat to the diaphragm (the temperature detecting portion) 301 because the heating resistive element 4044 is disposed in the center portion of the radiator wire 4042.

EXAMPLE 2

Figure 8:
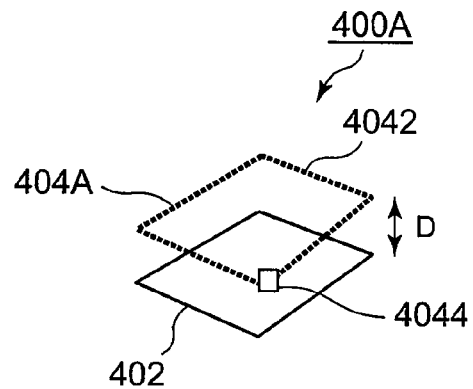
FIG. 8 is a schematic perspective view illustrative of only an electromagnetic wave resonance structure according to a second example of this invention that is used in the electromagnetic wave detector according to the first exemplary embodiment illustrated in FIG. 6.

Referring now to FIG. 8, the description will proceed to an electromagnetic wave resonance structure 400A according to a second example of this invention.

FIG. 8 is a schematic perspective view illustrative of only the electromagnetic wave resonance structure 400A used in the electromagnetic wave detector according to the first exemplary embodiment illustrated in FIG. 6.

The electromagnetic wave resonance structure 400A illustrated in FIG. 8 is similar in structure to the electromagnetic wave resonance structure 400 illustrated in FIG. 7 except that the radiator is modified from that illustrated in FIG. 7 as will later become clear. The radiator is therefore depicted at 404A. In addition, the same reference signs are attached to those similar to those illustrated in FIG. 7 and the description thereof is omitted.

In the radiator 404 illustrated in FIG. 7, the heating resistive element 4044 is disposed in the center portion of the radiator wire 4042.

In comparison with this, in the radiator 404A illustrated in FIG. 8, the heating resistive element 4044 is disposed in a corner portion of the radiator wire 4042.

Now, the description will proceed to an effect of the second example of this invention.

The second example has an advantageous in that structure is simple and it is capable of easily manufacturing it compared with the first example because the heating resistive element 4044 is disposed in the corner portion of the radiator wire 4042.

EXAMPLE 3

Figure 9:
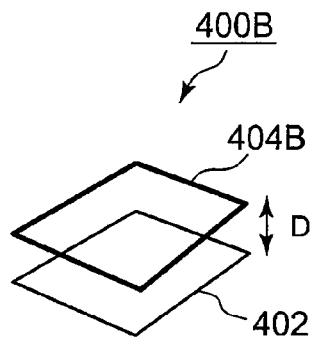
FIG. 9 is a schematic perspective view illustrative of only an electromagnetic wave resonance structure according to a third example of this invention that is used in the electromagnetic wave detector according to the first exemplary embodiment illustrated in FIG. 6.

Referring now to FIG. 9, the description will proceed to an electromagnetic wave resonance structure 400B according to a third example of this invention.

FIG. 9 is a schematic perspective view illustrative of only the electromagnetic wave resonance structure 400B used in the electromagnetic wave detector according to the first exemplary embodiment illustrated in FIG. 6.

The electromagnetic wave resonance structure 400B illustrated in FIG. 9 is similar in structure to the electromagnetic wave resonance structure 400A illustrated in FIG. 8 except that the radiator is modified from that illustrated in FIG. 8 as will later become clear. The radiator is therefore depicted at 404B. In addition, the same reference signs are attached to those similar to those illustrated in FIG. 8 and the description thereof is omitted.

The illustrated radiator 404B comprises only a square heating resistor wire having four sides L each of which is set in a quarter of the specific wavelength λ.

Now, the description will proceed to an effect of the third example of this invention.

The third example has an advantageous in that a component count is reduced and it is capable of easily manufacturing it compared with the first and the second examples because the radiator 404B comprises one piece consisting of the square heating resistor wire.

EXAMPLE 4

Figure 10:
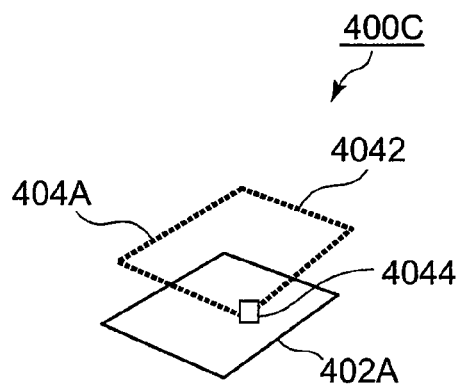
FIG. 10 is a schematic perspective view illustrative of only an electromagnetic wave resonance structure according to a fourth example of this invention that is used in the electromagnetic wave detector according to the first exemplary embodiment illustrated in FIG. 6.

Referring now to FIG. 10, the description will proceed to an electromagnetic wave resonance structure 400C according to a fourth example of this invention.

FIG. 10 is a schematic perspective view illustrative of only the electromagnetic wave resonance structure 400C used in the electromagnetic wave detector according to the first exemplary embodiment illustrated in FIG. 6.

The electromagnetic wave resonance structure 400C illustrated in FIG. 10 is similar in structure to the electromagnetic wave resonance structure 400A illustrated in FIG. 8 except that the reflector is modified from that illustrated in FIG. 8 as will later become clear. The reflector is therefore depicted at 402A. In addition, the same reference signs are attached to those similar to those illustrated in FIG. 8 and the description thereof is omitted.

The illustrated reflector 402A comprises a reflector layer. The reflector layer 402A is made of metal film, for example, of aluminum or the like.

Now, the description will proceed to an effect of the fourth example of this invention.

The fourth example has an advantageous in that it is capable of easily manufacturing it compared with the second example because the reflector 402A comprises the reflector layer.

EXAMPLE 5

Figure 11:
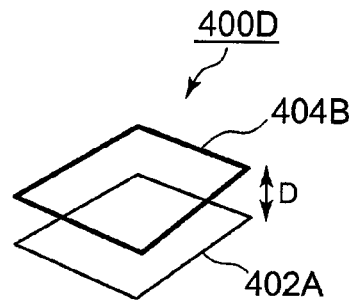
FIG. 11 is a schematic perspective view illustrative of only an electromagnetic wave resonance structure according to a fifth example of this invention that is used in the electromagnetic wave detector according to the first exemplary embodiment illustrated in FIG. 6.

Referring now to FIG. 11, the description will proceed to an electromagnetic wave resonance structure 400D according to a fifth example of this invention.

FIG. 11 is a schematic perspective view illustrative of only the electromagnetic wave resonance structure 400D used in the electromagnetic wave detector according to the first exemplary embodiment illustrated in FIG. 6.

The electromagnetic wave resonance structure 400D illustrated in FIG. 11 is similar in structure to the electromagnetic wave resonance structure 400B illustrated in FIG. 9 except that the reflector is modified from that illustrated in FIG. 9 as will later become clear. In addition, the same reference signs are attached to those similar to those illustrated in FIG. 9 and the description thereof is omitted.

The illustrated reflector 402A comprises the reflector layer.

Now, the description will proceed to an effect of the fifth example of this invention.

The fifth example has an advantageous in that it is capable of easily manufacturing it compared with the third example because the reflector 402A comprises the reflector layer.

EXAMPLE 6

Figure 12:
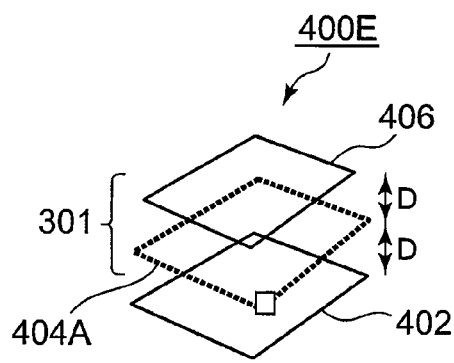
FIG. 12 is a schematic perspective view illustrative of only an electromagnetic wave resonance structure according to a sixth example of this invention that is used in the electromagnetic wave detector according to the first exemplary embodiment illustrated in FIG. 6.

Referring now to FIG. 12, the description will proceed to an electromagnetic wave resonance structure 400E according to a sixth example of this invention.

FIG. 12 is a schematic perspective view illustrative of only the electromagnetic wave resonance structure 400E used in the electromagnetic wave detector according to the first exemplary embodiment illustrated in FIG. 6.

The electromagnetic wave resonance structure 400E illustrated in FIG. 12 is similar in structure to the electromagnetic wave resonance structure 400A illustrated in FIG. 8 except that the electromagnetic wave resonance structure 400E further comprises a director wire 406. Accordingly, the same reference signs are attached to those similar to those illustrated in FIG. 8 and the description thereof is omitted.

The director wire 406 is disposed so as to be opposed to the reflector wire 402 in a state where the radiator 404A is sandwiched between the director wire 406 and the reflector wire 402. The director wire 406 has a square having four sides L each of which is set in a quarter of the specific wavelength λ. In addition, the director wire 406 is apart from the reflector 404A by a distance D equal to the above-mentioned gap D. A material having a small resistance value is used as the director wire 406. The director wire 406 is formed, for example, by forming a thin film and thereafter by etching the thin film.

Now, the description will proceed to an effect of the sixth example of this invention.

The sixth example has an advantageous in that directivity is improved compared with the second example because the electromagnetic wave resonance structure 400E further comprises the director wire 406.

EXAMPLE 7

Figure 13:
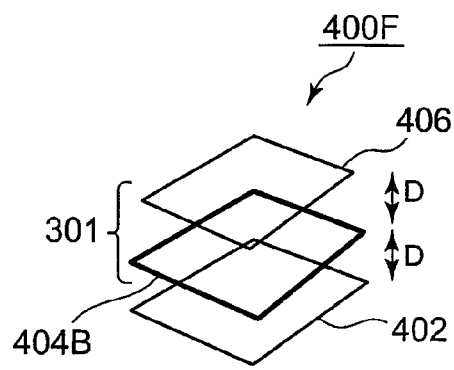
FIG. 13 is a schematic perspective view illustrative of only an electromagnetic wave resonance structure according to a seventh example of this invention that is used in the electromagnetic wave detector according to the first exemplary embodiment illustrated in FIG. 6.

Referring now to FIG. 13, the description will proceed to an electromagnetic wave resonance structure 400F according to a seventh example of this invention.

FIG. 13 is a schematic perspective view illustrative of only the electromagnetic wave resonance structure 400F used in the electromagnetic wave detector according to the first exemplary embodiment illustrated in FIG. 6.

The electromagnetic wave resonance structure 400F illustrated in FIG. 13 is similar in structure to the electromagnetic wave resonance structure 400B illustrated in FIG. 9 except that the electromagnetic wave resonance structure 400F further comprises a director wire 406. Accordingly, the same reference signs are attached to those similar to those illustrated in FIG. 9 and the description thereof is omitted.

The director wire 406 is disposed so as to be opposed to the reflector wire 402 in a state where the heating resistor wire 404B is sandwiched between the director wire 406 and the reflector wire 402. The director wire 406 is apart from the heating resistor wire 404B by a distance D equal to the above-mentioned gap D.

Now, the description will proceed to an effect of the seventh example of this invention.

The seventh example has an advantageous in that directivity is improved compared with the third example because the electromagnetic wave resonance structure 400F further comprises the director wire 406.

EXAMPLE 8

Referring now to FIG. 14, the description will proceed to an electromagnetic wave resonance structure 400G according to an eighth example of this invention.

FIG. 14 is a schematic perspective view illustrative of only the electromagnetic wave resonance structure 400G used in the electromagnetic wave detector according to the first exemplary embodiment illustrated in FIG. 6.

The electromagnetic wave resonance structure 400G illustrated in FIG. 14 is similar in structure to the electromagnetic wave resonance structure 400C illustrated in FIG. 10 except that the electromagnetic wave resonance structure 400G further comprises a director wire 406. Accordingly, the same reference signs are attached to those similar to those illustrated in FIG. 10 and the description thereof is omitted.

The director wire 406 is disposed so as to be opposed to the reflector layer 402A in a state where the radiator 404A is sandwiched between the director wire 406 and the reflector layer 402A. The director wire 406 is apart from the radiator 404A by a distance D equal to the above-mentioned gap D.

Now, the description will proceed to an effect of the eighth example of this invention.

The eighth example has an advantageous in that directivity is improved compared with the fourth example because the electromagnetic wave resonance structure 400G further comprises the director wire 406.

EXAMPLE 9

Figure 15:
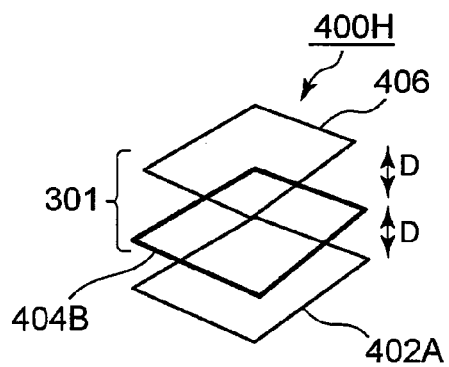
FIG. 15 is a schematic perspective view illustrative of only an electromagnetic wave resonance structure according to a ninth example of this invention that is used in the electromagnetic wave detector according to the first exemplary embodiment illustrated in FIG. 6.

Referring now to FIG. 15, the description will proceed to an electromagnetic wave resonance structure 400H according to a ninth example of this invention.

FIG. 15 is a schematic perspective view illustrative of only the electromagnetic wave resonance structure 400H used in the electromagnetic wave detector according to the first exemplary embodiment illustrated in FIG. 6.

The electromagnetic wave resonance structure 400H illustrated in FIG. 15 is similar in structure to the electromagnetic wave resonance structure 400D illustrated in FIG. 11 except that the electromagnetic wave resonance structure 400H further comprises a director wire 406. Accordingly, the same reference signs are attached to those similar to those illustrated in FIG. 11 and the description thereof is omitted.

The director wire 406 is disposed so as to be opposed to the reflector layer 402A in a state where the heating resistor wire 404B is sandwiched between the director wire 406 and the reflector layer 402A. The director wire 406 is apart from the heating resistor wire 404B by a distance D equal to the above-mentioned gap D.

Now, the description will proceed to an effect of the ninth example of this invention.

The ninth example has an advantageous in that directivity is improved compared with the fifth example because the electromagnetic wave resonance structure 400H further comprises the director wire 406.

EXAMPLE 10

Figure 16:
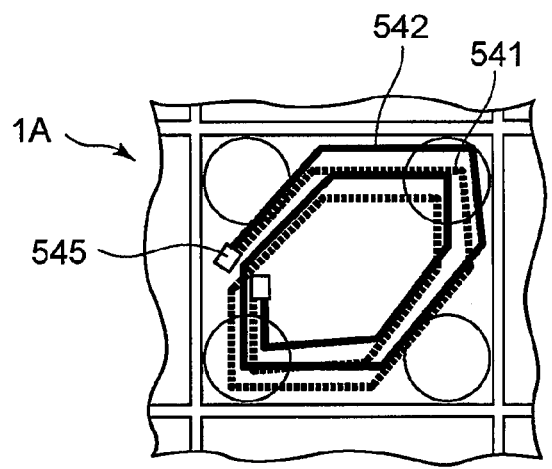
FIG. 16 is a plan view schematically illustrating a structure of one picture element of an electromagnetic wave detector (a bolometer-type THz-wave detector) according to a tenth example of this invention that is a concrete example of an electromagnetic wave detector according to a second exemplary embodiment of this invention.
Figure 17:
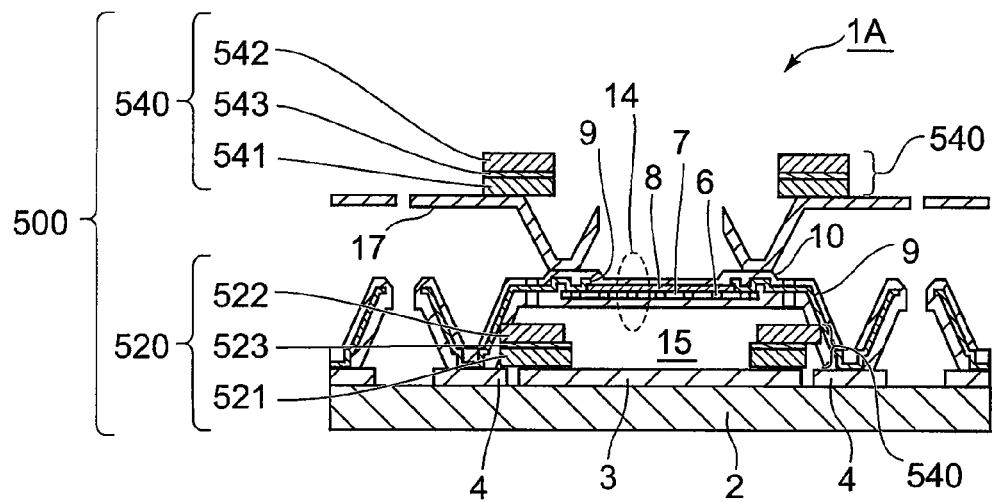
FIG. 17 is a sectional view schematically illustrating the structure of one picture element of the electromagnetic wave detector (the bolometer-type THz-wave detector) illustrated in FIG. 16.

Referring now to FIGS. 16 and 17, the description will proceed to an electromagnetic wave detector 10A according to a tenth example of this invention. The electromagnetic wave detector 10A is a concrete example of the electromagnetic wave detector according to the second exemplary embodiment of this invention as described above and shows an example of the bolometer-type THz-wave detector. Accordingly, the incident electromagnetic wave comprises a THz wave having the specific wavelength λ which is laid in a range between 3 millimeter and 30 micrometer, both inclusive.

FIG. 16 is a plan view schematically illustrating a structure of one picture element of the bolometer-type THz-wave detector 1A while FIG. 17 is a sectional view schematically illustrating the structure of one picture element of the bolometer-type THz-wave detector 1A.

The illustrated bolometer-type THz-wave detector 1A is similar in structure and operation to the bolometer-type THz-wave detector 1 illustrated in FIG. 4 except that the bolometer-type THz-wave detector 1A comprises an electromagnetic wave resonance structure 500 which will later be described in place of the absorbing film 16. Accordingly, the same reference signs are attached to those similar to those illustrated in FIG. 4 and the description thereof is omitted in order to simplify the description.

However, in the bolometer-type THz-wave detector 1A illustrated in FIG. 17, the dielectric cover 11, the read-out circuit 2a, and the first protective film 5 are omitted although they are illustrated in FIG. 4.

The electromagnetic wave resonance structure 500 is provided to the circuit substrate 2 and to the canopy 17. The electromagnetic wave resonance structure 500 is configured to convert the electromagnetic wave having the specific wavelength λ to heat to deliver the converted heat to the temperature detecting portion 14.

The illustrated electromagnetic wave resonance structure 500 comprises a reflector 520 formed on the circuit substrate 2 and a radiator 540 formed on the canopy 17. The radiator 540 has a loop length with a length equal to the specific wavelength λ and includes electromagnetic wave/heat converting means configured to convert the electromagnetic wave having the specific wavelength λ to the heat.

It will be assumed that a gap between the reflector 520 and the radiator 540 is represented by D. In this event, the gap D and the specific wavelength λ are satisfied with a following expression:

$$0.1\lambda \leq D \leq 0.25\lambda.$$

In the example being illustrated, the reflector 520 comprises a loop-shaped reflector wire while the radiator 540 comprises a loop-shaped resonance resistor wire. The loop-shaped reflector wire 520 comprises a plurality of loops having a loop length with an overall length equal to the specific wavelength λ. Likewise, the loop-shaped resonance resistor wire 540 comprises a plurality of loops having a loop length with an overall length equal to specific wavelength λ.

The illustrated loop-shaped reflector wire 520 is formed on first and second reflector wire layers 521 and 522 through which a thin interlayer film 523 made of SiN is inserted. The loop-shaped reflector wire formed on the first reflector wire layer 521 comprises a closed curve while the loop-shaped reflector wire formed on the second reflector wire layer 522 also comprises a closed curve. The first and the second reflector wire layers 521 and 522 are connected via contact holes (not shown) like at 545 in FIG. 16.

Similarly, the loop-shaped resonance resistor wire 540 is also formed on first and second resonance wire layers 541 and 542 through which a thin interlayer film 543 made of SiN is inserted. As shown in FIG. 16, the loop-shaped resonance wire resistor wire formed on the first resonance wire layer 541 comprises a closed curve while the loop-shaped resonance wire resistor wire formed on the second resonance wire layer 542 comprises a closed curve. As shown in FIG. 16, the first and the second resonance wire layers 541 and 542 are connected via contact holes 545.

Although each of the loop-shaped reflector wire 520 and the loop-shaped resonance resistor wire 540 is formed with two layers in the example being illustrated, of course, they may be three or more layers. In addition, each of the loop-shaped reflector wire 520 and the loop-shaped resonance resistor wire 540 has the number of loops and total loop length which are selected by the wavelength of the incident THz wave.

Now, the description will proceed to an effect of the tenth example of this invention.

When the electromagnetic wave passes through a plane enclosed with the loop-shaped resonance resistor wire 540, a magnetic field of an area enclosed with the loop-shaped resonance resistor wire 540 changes, and therefore a current flows in the loop-shaped resonance resistor wire 540 by electromagnetic induction. Due to flowing of the current, currents flow in the contact holes 545 connected to the loop-shaped resonance resistor wire 540, and therefore the contact holes 545 generate heat. The heat generated by the contact holes 545 is conveyed to the canopy 17.

In the manner which is described above, the electromagnetic wave detector 1A according to the tenth example produces an effect that it is possible to improve the efficiency for converting electromagnetic energy into heat energy because the heat generated by the contact holes 545 is conveyed to the canopy 17.

EXAMPLE 11

Figure 18:
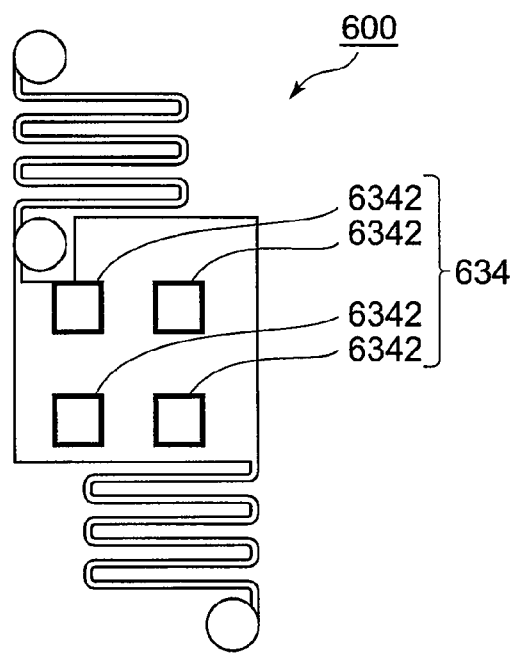
FIG. 18 is a plan view schematically illustrating a structure of one picture element of an electromagnetic wave detector (a bolometer-type infrared detector) according to an eleventh example of this invention that is a concrete example of an electromagnetic wave detector according to a third exemplary embodiment of this invention.
Figure 19:
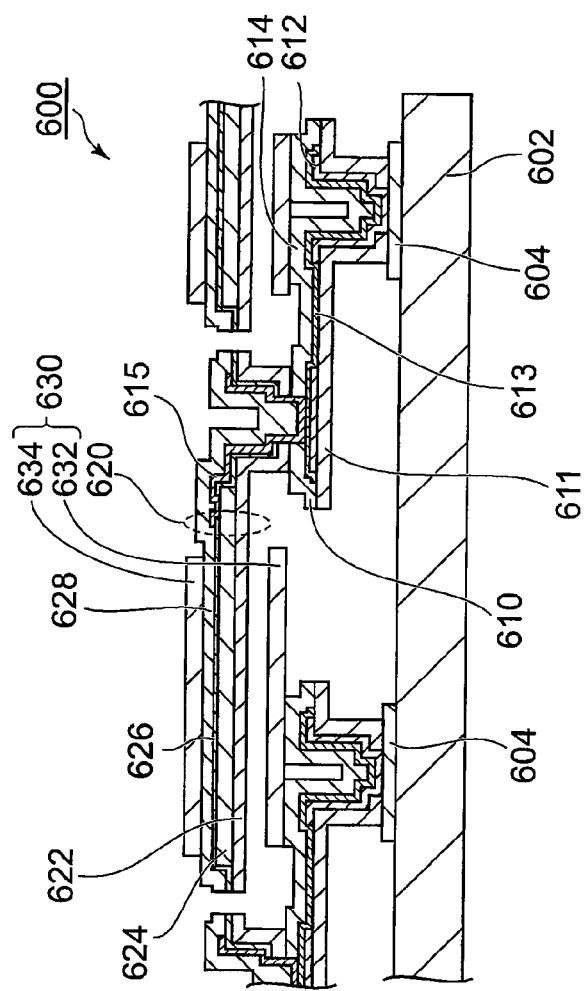
FIG. 19 is a sectional view schematically illustrating the structure of one picture element of the electromagnetic wave detector (the bolometer-type infrared detector) illustrated in FIG. 18.

Referring now to FIGS. 18 and 19, the description will proceed to an electromagnetic wave detector 600 according to an eleventh example of this invention. The electromagnetic wave detector 600 is a concrete example of the electromagnetic wave detector according to the third exemplary embodiment of this invention as described above and shows an example of the bolometer-type infrared detector.

The illustrated example shows a case where one pixel has a shape (size) of a square with four sides each of which has a size of 12 micrometer. In addition, the illustrated example shows a case where the incident electromagnetic wave comprises the infrared ray having the specific wavelength λ of 10 micrometer. Furthermore, in this example, it will be assumed that a wavelength fractional shortening is equal to 1.1. Accordingly, although a sensed wavelength being the specific wavelength λ is equal to 10 micrometer a loop length of each loop antenna becomes 11 micrometer. As a result, when the loop antenna comprises a loop antenna of a square, a side thereof becomes 2.75 micrometer.

FIG. 18 is a plan view schematically illustrating a structure of one picture element of the bolometer-type infrared detector 600 while FIG. 19 is a sectional view schematically illustrating the structure of one picture element of the bolometer-type infrared detector 600.

As shown in FIG. 19, the bolometer-type infrared detector 600 is configured to form, on a circuit substrate 602 in which a signal processing circuit such as a read-out circuit and so on, contacts 604 for connecting to the read-out circuit and to form protection films (not shown) thereon.

In addition, a supporting portion (a beam) 610 is formed on each of the contacts 604. The supporting portion (the beam) 610 comprises a beam lower protection film 611, a back metal 612, a beam wire 613, a beam upper protection film 614, and a stud metal 615. The supporting portion (the beam) 610 has a portion which extends in parallel with a main surface of the circuit substrate 602. The read-out circuit is electrically connected through the contact 604 to the back metal 612, the beam wire 613, and the stud metal 615.

In addition, a temperature detecting portion (a diaphragm) 620 is supported by the supporting portion (the beam) 610 over the circuit substrate 602 in midair. The temperature detecting portion (the diaphragm) 620 comprises a bolometer lower protection film 622, a bolometer thin film 624, a bolometer upper protection film 626, and an upper protection film 628. The bolometer thin film 624 is connected to the read-out circuit through the stud metal 615, the beam wire 613, the back metal 612, and the contact 604.

Although vanadium oxide or titanium oxide is used as the bolometer thin film 624, another material with a large TCR (Temperature Coefficient Resistance) may be used as the bolometer thin film 624.

As shown in FIG. 19, the bolometer-type infrared detector 600 comprises an electromagnetic wave resonance structure 630 which is provided to the supporting portion (the beam) 610 and to the temperature detecting portion 620. The electromagnetic wave resonance structure 630 is configured to convert the electromagnetic wave (the infrared ray) having the specific wavelength λ to heat to deliver the converted heat to the temperature detecting portion 620.

The electromagnetic wave resonance structure 630 comprises a reflector 632 formed on the supporting portion (the beam) 610 and a radiator 634 formed on the upper protection film 628 of the temperature detecting portion 620. The radiator 634 has a loop length with a length equal to the specific wavelength λ and includes electromagnetic wave/heat converting means configured to convert the electromagnetic wave (the infrared ray) having the specific wavelength λ to the heat.

It will be assumed that a gap between the reflector 632 and the radiator 634 is represented by D. In this event, the gap D and the specific wavelength λ are satisfied with a following expression:

$$0.1\lambda \le D \le 0.25\lambda.$$

Although the illustration is not made, in the example being illustrated, the reflector 632 comprises four square loop-shaped reflector wires like at 6342 in FIG. 18. Each square loop-shaped reflector wire has four sides L each of which is set in a quarter (which is equal to 2.75 micrometer in this example) of the specific wavelength λ (which is equal to 11 micrometer by the wavelength fractional shortening of 1.1 in this example). In addition, the reflector 632 may comprise a reflector layer.

On the other hand, as shown in FIG. 18, the radiator 634 comprises four square loop-shaped heating resistor wires 6342. Each square loop-shaped heating resistor wire 6342 has four sides L each of which is set in a quarter (which is equal to 2.75 micrometer in this example) of the specific wavelength λ (which is equal to 11 micrometer by the wavelength fractional shortening of 1.1 in this example). That is, one loop-shaped heating resistor wire 6342 is created on the upper protection film 628 of the temperature detecting portion 620 at a pitch of 2.75 micrometer.

In the manner which is described above, inasmuch as one picture element has a square shape (size) having four sides each of which is equal to 12 micrometer in this example, the radiator 634 comprises the (2×2) loop-shaped heating resistor wires 6342.

Accordingly, if one picture element has a square shape (size) having four sides each of which is equal to 23.5 micrometer, the radiator 634 comprises (4×4) loop-shaped heating resistor wires 6342.

As a matter of course, the number of the loop-shaped heating resistor wires 6342 changes (is selected) in dependence on the size (dimension) of one picture element and the specific wavelength (the sensed wavelength) λ. In addition, the plurality of loop-shaped heating resistor wires 6342 may preferably be arranged in rotational symmetry.

Although the illustrated example cites an example where the incident electromagnetic wave comprises the infrared ray having the specific wavelength λ of 10 micrometer, the incident electromagnetic wave may comprise an infrared ray having the specific wavelength λ which is laid in a range between 2 micrometer and 20 micrometer, both inclusive.

Now, the description will proceed to an effect of the eleventh example of this invention.

When the electromagnetic wave passes through a plane enclosed with the loop-shaped heating resistor wires 6342, a magnetic field of an area enclosed with the loop-shaped heating resistor wires 6342 changes, and therefore a current flows in the loop-shaped heating resistor wires 6342 by electromagnetic induction. Due to flowing of the current, currents flow in the loop-shaped heating resistor wires 6342, and therefore the loop-shaped heating resistor wires 6342 generate heat. The heat generated by the loop-shaped heating resistor wires 6342 is conveyed to the bolometer thin film 624.

In the manner which is described above, the electromagnetic wave detector 600 according to the eleventh example produces an effect that it is possible to improve the efficiency for converting electromagnetic energy into heat energy because the loop-shaped heating resistor wires 6342 is conveyed to the bolometer thin film 624.

While the invention has been particularly shown and described with reference to exemplary embodiments thereof, the invention is not limited to these embodiments. It will be understood by those of ordinary skilled in the art that various changes in form and details may be made therein without departing from the sprit and scope of the present invention as defined by the claims.

For example, although the above-mentioned examples cite the examples of the electromagnetic wave resonance structure including, as the radiator, a loop-shaped radiator, the radiator is not limited to the loop-shaped radiator. For instance, the radiator may comprises a scroll-shaped (a spiral-shaped) radiator. That is, the radiator may have any shape as long as a total length thereof is equal to the specific wavelength. In addition, although the above-mentioned examples cite the example of the silicon substrate as the substrate (the circuit substrate), of course, the substrate is not limited to the silicon substrate.

The whole or part of the exemplary embodiments disclosed above can be described as, but not limited to, the following supplementary notes.

(Supplementary note 1) An electromagnetic wave detector configured to detect an electromagnetic wave having a specific wavelength, comprising:

a substrate in which a read-out circuit is formed;

a temperature detecting portion disposed with a space from said substrate, said temperature detecting portion including a bolometer thin film and a first antenna wire;

a supporting portion configured to support said temperature detecting portion with a space from said substrate, said supporting portion including electrode wires which are connected to said read-out circuit and to said bolometer thin film; and a reflecting portion provided to said substrate, said reflecting portion reflecting the electromagnetic wave penetrating said temperature detecting portion toward said temperature detecting portion.

(Supplementary note 2) The electromagnetic wave detector according to Supplementary note 1, comprising a resistive element which is formed on said temperature detecting portion and which is connected to said first antenna wire.

(Supplementary note 3) The electromagnetic wave detector according to Supplementary note 1 or 2, further comprising a second antenna wire, wherein said second antenna wire is disposed so that the electromagnetic wave penetrating said temperature detecting portion passes through a surface enclosed with said second antenna wire before the electromagnetic wave penetrating said temperature detecting portion enters to said reflecting portion.

(Supplementary note 4) The electromagnetic wave detector according to Supplementary note 1 or 2, wherein said substrate comprises a second antenna wire.

(Supplementary note 5) The electromagnetic wave detector according to Supplementary note 1 or 2, wherein said reflecting portion comprises a second antenna wire.

(Supplementary note 6) The electromagnetic wave detector according to any one of Supplementary notes 3 to 5, wherein each of said first antenna wire and said second antenna wire has a loop antennal shape, said first antenna wire has a circumferential length shorter than that of said second antenna wire.

(Supplementary note 7) The electromagnetic wave detector according to any one of Supplementary notes 3 to 6, further comprising a third antenna wire.

(Supplementary note 8) The electromagnetic wave detector according to Supplementary note 7, wherein said third antenna wire has a length shorter than that of said first antenna wire.

(Supplementary note 9) The electromagnetic wave detector according to any one of Supplementary notes 1 to 8, comprising a radiator formed in said temperature detecting portion, said radiator having a loop length with a length equal to the specific wavelength and including electromagnetic wave/heat converting means configured to convert said electromagnetic wave having the specific wavelength to the heat.

(Supplementary note 10) The electromagnetic wave detector according to Supplementary note 9, wherein the specific wavelength is represented by $\lambda$, and a gap between said reflector and said radiator is represented by D, wherein the gap D and the specific wavelength $\lambda$ are satisfied with a following expression:

$$0.1\lambda \leq D \leq 0.25\lambda.$$

(Supplementary note 11) The electromagnetic wave detector according to Supplementary note 10, further comprising a director wire disposed so as to be opposed to said reflector in a state where said radiator is sandwiched between said director wire and said reflector, wherein said director wire has a square having four sides each of which is set in a quarter of the specific wavelength $\lambda$ and which is apart from said reflector by a distance equal to the gap D.

(Supplementary note 12) An electromagnetic wave detector configured to detect an electromagnetic wave having a specific wavelength, comprising:

a substrate in which a read-out circuit is formed;

a temperature detecting portion disposed with a space from said substrate, said temperature detecting portion including a bolometer thin film and a resistor;

a supporting portion configured to support said temperature detecting portion with a space from said substrate, said supporting portion including electrode wires which are connected to said read-out circuit and to said bolometer thin film; and a first antenna wire electrically connected to said resistor, wherein said first antenna wire is disposed so that the electromagnetic wave entering to said temperature detecting portion vertically passes through a surface enclosed with said first antenna wire.

(Supplementary note 13) An electromagnetic wave detector configured to detect an electromagnetic wave having a specific wavelength, comprising:

a substrate in which a read-out circuit is formed;

a temperature detecting portion disposed with a space from said substrate, said temperature detecting portion including a bolometer thin film;

a supporting portion configured to support said temperature detecting portion with a space from said substrate, said supporting portion including electrode wires which are connected to said read-out circuit and to said bolometer thin film; and a canopy conveying generated heat to said temperature detecting portion, said canopy including a first antenna wire, wherein said first antenna wire is disposed so that the electromagnetic wave entering to said temperature detecting portion vertically passes through a surface enclosed with said first antenna wire.

(Supplementary note 14) An image pickup device in which a plurality of electromagnetic wave detectors each according to any one of Supplementary notes 1 to 13 are arranged in a two-dimensional matrix fashion.

(Supplementary note 15) An electromagnetic wave detector configured to detect an electromagnetic wave having a specific wavelength, comprising:

a substrate in which a read-out circuit is formed;

a temperature detecting portion disposed so as to be apart from said substrate, said temperature detecting portion including a bolometer thin film;

a supporting portion configured to support said temperature detecting portion in a state where said temperature detecting portion is suspended from said substrate, said supporting portion including electrode wires which are connected to said read-out circuit and to said bolometer thin film; and an electromagnetic wage resonance structure provided to said substrate and to said temperature detecting portion, said electromagnetic wave resonance structure being configured to convert said electromagnetic wave having the specific wavelength to heat to deliver the converted heat to said temperature detecting portion.

(Supplementary note 16) The electromagnetic wave detector according to Supplementary note 15, wherein said electromagnetic wave comprises an infrared ray having the specific wavelength which is laid in a range between 2 micrometer and 20 micrometer, both inclusive.

(Supplementary note 17) The electromagnetic wave detector according to Supplementary note 15 or 16, wherein said electromagnetic wave resonance structure comprises:

a reflector formed on said substrate; and a radiator formed in said temperature detecting portion, said radiator having a loop length with a length equal to the specific wavelength and including electromagnetic wave/heat converting means configured to convert said electromagnetic wave having the specific wavelength to the heat.

(Supplementary note 18) The electromagnetic wave detector according to Supplementary note 17, wherein the specific wavelength is represented by $\lambda$, and a gap between said reflector and said radiator is represented by D, wherein the gap D and the specific wavelength $\lambda$ are satisfied with a following expression:

$$0.1\lambda \leq D \leq 0.25\lambda.$$

(Supplementary note 19) The electromagnetic wave detector according to Supplementary note 18, wherein said reflector comprises a square reflector wire having four sides each of which is set in a quarter of the specific wavelength $\lambda$.

(Supplementary note 20) The electromagnetic wave detector according to Supplementary note 18, wherein said reflector comprises a reflector layer.

(Supplementary note 21) The electromagnetic wave detector according to any one of Supplementary notes 18 to 20, wherein said radiator comprises:
a square radiator wire having four sides L each of which is set in a quarter of the specific wavelength λ; and
a heating resistive element connected to said radiator wire, said heating resistive element serving as said electromagnetic wave/heat converting means.

(Supplementary note 22) The electromagnetic wave detector according to Supplementary note 21, wherein said heating resistive element is disposed in a central portion of said radiator wire.

(Supplementary note 23) The electromagnetic wave detector according to Supplementary note 21, wherein said heating resistive element is disposed in a corner portion of said radiator wire.

(Supplementary note 24) The electromagnetic wave detector according to any one of Supplementary notes 18 to 20, wherein said radiator comprises a square heating resistor wire having four sides each of which is set in a quarter of the specific wavelength λ.

(Supplementary note 25) The electromagnetic wave detector according to any one of Supplementary notes 18 to 24, further comprising a director wire disposed so as to be opposed to said reflector in a state where said radiator is sandwiched between said director wire and said reflector, wherein said director wire has a square having four sides each of which is set in a quarter of the specific wavelength λ and which is apart from said reflector by a distance equal to the gap D.

(Supplementary note 26) An electromagnetic wave detector configured to detect an electromagnetic wave having a specific wavelength, comprising:
a substrate in which a read-out circuit is formed;
a temperature detecting portion disposed so as to be apart from said substrate, said temperature detecting portion including a bolometer thin film;
a supporting portion configured to support said temperature detecting portion in a state where said temperature detecting portion is suspended from said substrate, said supporting portion including electrode wires which are connected to said read-out circuit and to said bolometer thin film;
a canopy over said temperature detecting portion so as to extend from ambient edge portions of said temperature detecting portion outwards; and
an electromagnetic wage resonance structure provided to said substrate and to said canopy, said electromagnetic wave resonance structure being configured to convert said electromagnetic wave having the specific wavelength to heat to deliver the converted heat to said temperature detecting portion.

(Supplementary note 27) The electromagnetic wave detector according to Supplementary note 26, wherein said electromagnetic wave comprises a terahertz wave (a THz wave) having the specific wavelength which is laid in a range between 3 millimeter and 30 micrometer, both inclusive.

(Supplementary note 28) The electromagnetic wave detector according to Supplementary note 26 or 27, wherein said electromagnetic wave resonance structure comprises:
a reflector formed on said substrate; and
a radiator formed on said canopy, said radiator having a loop length with a length equal to the specific wavelength and including electromagnetic wave/heat converting means configured to convert said electromagnetic wave having the specific wavelength to the heat.

(Supplementary note 29) The electromagnetic wave detector according to Supplementary note 28, wherein the specific wavelength is represented by λ, and a gap between said reflector and said radiator is represented by D, wherein the gap D and the specific wavelength λ are satisfied with a following expression:

$$0.1\lambda \leq D \leq 0.25\lambda.$$

(Supplementary note 30) The electromagnetic wave detector according to Supplementary note 29,
wherein said reflector comprises a loop-shaped reflector wire comprising a plurality of loops having a loop length with an overall length equal to the specific wavelength λ, and
wherein said radiator comprises a loop-shaped resonance resistor wire comprising a plurality of loops having a loop length with an overall length equal to the specific wavelength λ.

(Supplementary note 31) The electromagnetic wave detector according to Supplementary note 30,
wherein said loop-shaped reflector wire is formed on a plurality of reflector wire layers through which interlayer films are inserted, said plurality of reflector wire layers being connected via contact holes,
wherein said loop-shaped resonance resistor wire is formed on a plurality of resonance wire layers through which interlayer films are inserted, said plurality of resonance wire layers being connected via contact holes.

(Supplementary note 32) An electromagnetic wave detector configured to detect an electromagnetic wave having a specific wavelength, comprising:
a substrate in which a read-out circuit is formed;
a temperature detecting portion disposed so as to be apart from said substrate, said temperature detecting portion including a bolometer thin film;
a supporting portion configured to support said temperature detecting portion in a state where said temperature detecting portion is suspended from said substrate, said supporting portion including electrode wires which are connected to said read-out circuit and to said bolometer thin film; and
an electromagnetic wave resonance structure provided to said supporting portion and to said temperature detecting portion, said electromagnetic wave resonance structure being configured to convert said electromagnetic wave having the specific wavelength to heat to deliver the converted heat to said temperature detecting portion.

(Supplementary note 33) The electromagnetic wave detector according to Supplementary note 32, wherein said electromagnetic wave comprises an infrared ray having the specific wavelength which is laid in a range between 2 micrometer and 20 micrometer, both inclusive.

(Supplementary note 34) The electromagnetic wave detector according to Supplementary note 32 or 33,
wherein said electromagnetic wave resonance structure comprises:
a reflector formed on said supporting portion; and
a radiator formed in said temperature detecting portion, said radiator having a loop length with a length equal to the specific wavelength and including electromagnetic wave/heat converting means configured to convert said electromagnetic wave having the specific wavelength to the heat.

(Supplementary note 35) The electromagnetic wave detector according to Supplementary note 34, wherein the specific wavelength is represented by λ, and a gap between said reflector and said radiator is represented by D, wherein the gap D and the specific wavelength λ are satisfied with a following expression:

$$0.1\lambda \leq D \leq 0.25\lambda.$$

(Supplementary note 36) The electromagnetic wave detector according to Supplementary note 35,
wherein said reflector comprises a plurality of square loop-shaped reflector wires each having four sides each of which is set in a quarter of the specific wavelength λ,
wherein said radiator comprises a plurality of square loop-shaped heating resistor wires each having four sides L each of which is set in a quarter of the specific wavelength λ.

(Supplementary note 37) An image pickup device in which a plurality of electromagnetic wave detectors each according to any one of Supplementary notes 15 to 36 are arranged in a two-dimensional matrix fashion.

What is claimed is:

1. An electromagnetic wave detector configured to detect an electromagnetic wave having a specific wavelength, comprising:
   a substrate in which a read-out circuit is formed;
   a temperature detecting portion a space from the substrate, the temperature detecting portion including a bolometer thin film and a first antenna wire;
   a supporting portion configured to support the temperature detecting portion and including at least one electrode wire electrically connected to the read-out circuit and the bolometer thin film; and
   a reflecting portion between the substrate and the temperature detecting portion, and configured to reflect the electromagnetic wave penetrating the temperature detecting portion toward the temperature detecting portion.

2. The electromagnetic wave detector of claim 1, comprising a resistive element formed on the temperature detecting portion and connected to the first antenna wire.

3. The electromagnetic wave detector of claim 1, further comprising a second antenna wire, enclosed between the temperature detecting portion and the reflecting portion.

4. The electromagnetic wave detector of claim 3, wherein each of the first antenna wire and the second antenna wire has a loop shape, and the first antenna wire has a circumferential length shorter than a circumferential length of the second antenna wire.

5. The electromagnetic wave detector of claim 3, further comprising a third antenna wire.

6. The electromagnetic wave detector of claim 5, wherein the third antenna wire has a length shorter than a length of the first antenna wire.

7. The electromagnetic wave detector of claim 1, wherein the substrate comprises a second antenna wire.

8. The electromagnetic wave detector of claim 1, wherein the reflecting portion comprises a second antenna wire.

9. The electromagnetic wave detector of claim 1, comprising a radiator formed in the temperature detecting portion.

10. The electromagnetic wave detector of claim 9, wherein the specific wavelength is represented by λ, and a gap between the reflecting portion and the radiator is represented by D, wherein the gap D and the specific wavelength λ are satisfied with a following expression:

$$0.1\lambda \leq D \leq 0.25\lambda.$$

11. The electromagnetic wave detector of claim 10, further comprising a director wire opposite the reflecting portion at a distance equal to the gap D, wherein the radiator is between the director wire and the reflecting portion, and wherein the director wire is formed in a square shape having four sides, each of the four sides being a quarter of the specific wavelength λ.

12. The electromagnetic wave detector of claim 9, wherein the radiator has a loop length equal to the specific wavelength and is configured to convert the electromagnetic wave having the specific wavelength to heat.

13. An image pickup device comprising a plurality of electromagnetic wave detectors, each as recited in claim 1, and arranged in a two-dimensional matrix.

14. An electromagnetic wave detector configured to detect an electromagnetic wave having a specific wavelength, comprising:
   a substrate in which a read-out circuit is formed;
   a temperature detecting portion a space from the substrate, the temperature detecting portion including a bolometer thin film and a resistor;
   a supporting portion configured to support the temperature detecting portion and including at least one electrode wire electrically connected to the read-out circuit and the bolometer thin film;
   a reflecting portion between the substrate and the temperature detecting portion;
   and
   a first antenna wire electrically connected to the resistor, wherein the first antenna wire is disposed such that the electromagnetic wave entering the temperature detecting portion vertically passes through a surface enclosed with the first antenna wire, and
   wherein the reflecting portion reflects the electromagnetic wave penetrating the temperature detecting portion toward the temperature detecting portion.

15. An image pickup device comprising a plurality of electromagnetic wave detectors, each as recited in claim 14 and arranged in a two-dimensional matrix.

16. The electromagnetic wave detector of claim 14, comprising a radiator formed in the temperature detecting portion.

17. The electromagnetic wave detector of claim 16, wherein the radiator has a loop length equal to the specific wavelength and is configured to convert the electromagnetic wave having the specific wavelength to heat.

18. The electromagnetic wave detector of claim 14, further comprising a second antenna wire between the temperature detecting portion and the reflecting portion, wherein each of the first antenna wire and the second antenna wire has a loop shape, and the first antenna wire has a circumferential length shorter than a circumferential length of the second antenna wire.

19. An electromagnetic wave detector configured to detect an electromagnetic wave having a specific wavelength, comprising:
   a substrate in which a read-out circuit is formed;
   a temperature detecting portion a space from the substrate, the temperature detecting portion including a bolometer thin film;
   a supporting portion configured to support the temperature detecting portion a space from the substrate, the supporting portion including at least one electrode wire connected to the read-out circuit and to the bolometer thin film;
   a reflecting portion between the substrate and the temperature detecting portion;
   and
   a canopy configured to convey generated heat to the temperature detecting portion, the canopy including a first antenna wire, wherein the first antenna wire is disposed so that the electromagnetic wave entering the temperature detecting portion vertically passes through a surface enclosed with the first antenna wire, and wherein the reflecting portion reflects the electromagnetic wave penetrating the temperature detecting portion toward the temperature detecting portion.

20. An image pickup device comprising a plurality of electromagnetic wave detectors, each as recited in claim 19 and arranged in a two-dimensional matrix.

* * * * *